(12) United States Patent
Lynch

(10) Patent No.: US 7,946,383 B2
(45) Date of Patent: May 24, 2011

(54) ACOUSTIC LOAD MITIGATOR

(75) Inventor: John J. Lynch, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 524 days.

(21) Appl. No.: 11/940,436

(22) Filed: Nov. 15, 2007

(65) Prior Publication Data

US 2009/0127024 A1    May 21, 2009

(51) Int. Cl.
*F01N 1/00* (2006.01)
*F01N 1/02* (2006.01)
*F01N 1/06* (2006.01)
*F01N 5/00* (2006.01)
*F01N 13/08* (2006.01)
*F01N 13/18* (2006.01)
*F02K 1/08* (2006.01)
*F02M 35/10* (2006.01)
*G10K 11/16* (2006.01)

(52) U.S. Cl. ........ 181/250; 181/206; 181/212; 181/216; 181/227; 181/241; 181/247; 181/251; 181/253; 123/184.53; 123/184.57; 381/71.5

(58) Field of Classification Search .................. 181/250, 181/216, 241, 253, 206, 227; 123/184.53, 123/184.57; 381/71.5
See application file for complete search history.

(56) References Cited

U.S. PATENT DOCUMENTS

| | | | | |
|---|---|---|---|---|
| 5,033,581 A * | 7/1991 | Feuling | | 181/257 |
| 5,333,576 A * | 8/1994 | Verkleeren | | 123/184.53 |
| 5,590,913 A * | 1/1997 | Morris et al. | | 285/18 |
| 6,595,320 B2 * | 7/2003 | Hwang et al. | | 181/253 |
| 6,633,646 B1 * | 10/2003 | Hwang | | 381/71.5 |
| 6,691,733 B1 * | 2/2004 | Morris | | 137/317 |
| 6,796,859 B1 * | 9/2004 | Justen et al. | | 440/88 A |
| 7,047,725 B2 * | 5/2006 | Moe et al. | | 60/262 |
| 7,069,950 B1 * | 7/2006 | Bittner | | 137/625.37 |
| 7,416,051 B2 * | 8/2008 | Byrne et al. | | 181/254 |
| 2005/0205351 A1 * | 9/2005 | D'Angelo | | 181/216 |
| 2007/0006640 A1 * | 1/2007 | Gysling | | 73/61.44 |
| 2008/0080080 A1 * | 4/2008 | Armstrong | | 359/894 |

FOREIGN PATENT DOCUMENTS

JP    2-67452 A    3/1990

OTHER PUBLICATIONS

Extended European Search Report mailed Mar. 4, 2009 in corresponding European Application No. 08168813.7.

\* cited by examiner

*Primary Examiner* — Elvin G Enad
*Assistant Examiner* — Christina Russell
(74) *Attorney, Agent, or Firm* — Nixon & Vanderhye P.C.

(57) ABSTRACT

A system for reducing an acoustic load of a fluid flow includes a first pipe. The first pipe includes a first end and a second end and a first aperture and a second aperture, the first and second apertures being intermediate the first and second ends. A second pipe includes a first end and a second end and a third aperture intermediate the first and second ends. The second pipe is connected at its first end to the first pipe at the first aperture. A bypass pipe includes a first end connected to the second aperture of the first pipe and a second end connected to the third aperture of the second pipe. A method of reducing an acoustic load of a flow in a standpipe connected to a first pipe configured to carry a main flow includes providing a bypass flow from the first pipe to the standpipe.

19 Claims, 5 Drawing Sheets

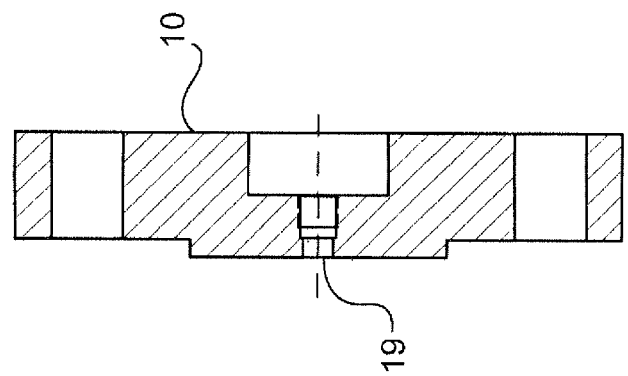
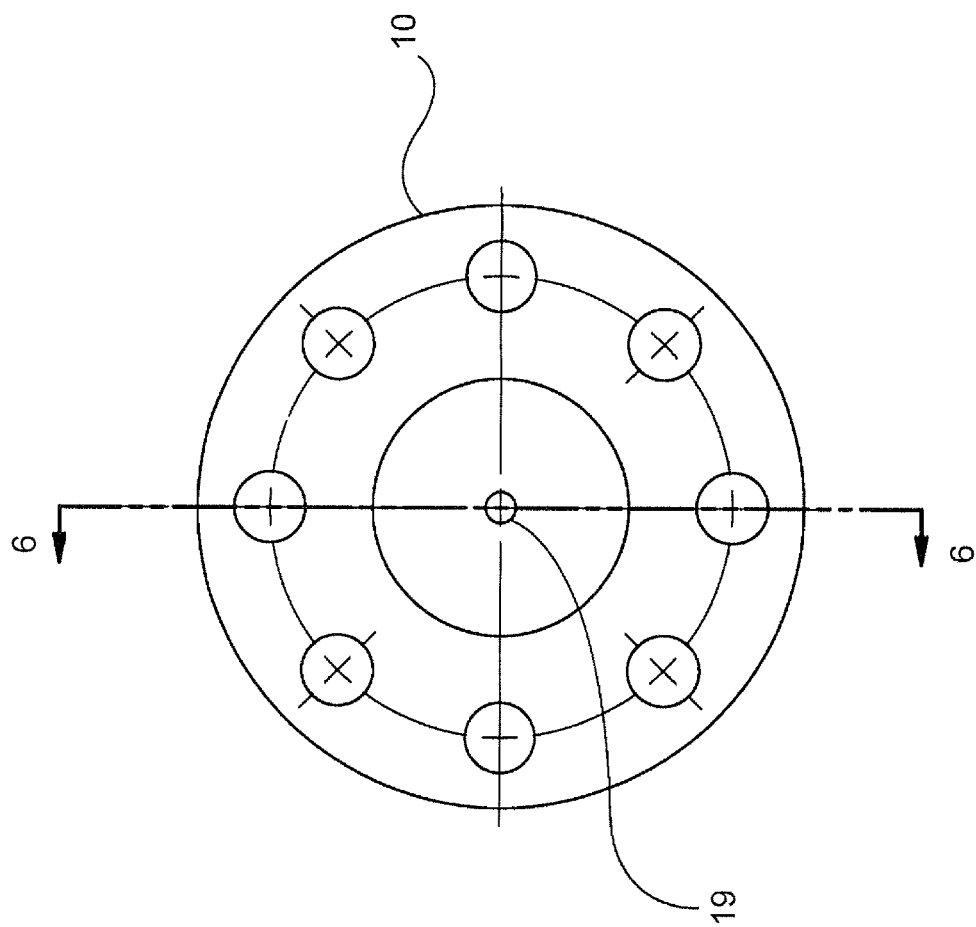
Fig. 6
Fig. 5

US 7,946,383 B2

ACOUSTIC LOAD MITIGATOR

BACKGROUND OF THE INVENTION

The present invention relates generally to nuclear reactors, and more particularly to mitigating acoustic loads in a nuclear reactor.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

Heat is generated within the core and water circulated up through the core is at least partially converted to steam. Steam separators separate the steam and the water. Residual water is removed from the steam by steam dryers located above the core. The de-watered steam exits the RPV through a steam outlet near the vessel top head for flow outside the RPV to drive a turbine.

The flow of steam through the dryers can be unbalanced or mismatched, with much of the steam flow preferentially passing through the top of the dryer vanes. At increased power levels of the reactor, increased steam flow may cause the steam velocity to exceed the breakthrough velocity in local regions of the dryer vanes. The dryer ceases to remove moisture droplets from the steam in those areas where the breakthrough velocity has been exceeded. Wet steam that breaks through, or exits the dryer, then can cause undesirable effects in the rest of the power plant. In addition to the potential for erosion of the metal components, the excess moisture can transport activated particulates from the reactor to the pipes, turbines and heat exchangers which are downstream of the separator which can increase the dose rate in the turbine hall, and make equipment maintenance more difficult.

One of the sources of loading that has destroyed or damaged equipment is acoustic resonance of the fluid inside a standoff pipe, such as a safety relief valve. The safety relieve valve, or valves, with steam flow past their entrances, and the acoustic resonance which naturally occurs, causes acoustic pressures to travel upstream, causing damage to devices, for example, the steam dryers.

Previous attempts to reduce damage to devices such as steam dryers have included predicting or estimating the loading on the steam dryer, and computing the stress on the dryer, and modifying the dryer to decrease the computed stresses.

Another attempt to reduce the damage to equipment such as steam dryers has included a Helmholtz resonator provided on the relief valves. However, the Helmholtz resonator is a large cantilevered bottle-shaped device which is difficult to support in the environment of a nuclear power generating station.

A Herschel-Quincke tube is used to passively cancel acoustic noise at a single frequency. The Herschel-Quincke tube comprises a main pipe and a bypass pipe connecting two points on the main pipe. The two points are separated by a distance equal to the quarter-wavelength of the frequency to be cancelled. The Herschel-Quincke tube operates on the principal that starting from one point, proceeding to the second point, there are two paths, and along those two paths, the sound is cancelled because along one path, a maximum is reached along the wavelength, and along the other path, the opposite of that maximum is reached.

BRIEF DESCRIPTION OF THE INVENTION

In one embodiment of the invention, a system for reducing an acoustic load of a fluid flow comprises a first pipe. The first pipe comprises a first end and a second end and a first aperture and a second aperture. The first and second apertures are intermediate the first and second ends. A second pipe comprises a first end and a second end and a third aperture intermediate the first and second ends. The second pipe is connected at its first end to the first pipe at the first aperture. A bypass pipe comprises a first end connected to the second aperture of the first pipe and a second end connected to the third aperture of the second pipe.

In another embodiment of the invention, a method of reducing an acoustic load of a flow in a standpipe connected to a first pipe configured to carry a main flow comprises providing a bypass flow from the first pipe to the standpipe.

BRIEF DESCRIPTION OF THE DRAWINGS

FIGS. 5 and 6 are a planned view and a cross-sectional view, respectively, of a pipe flange for mounting of a safety relief valve on a standoff pipe of the load mitigator of FIGS. 1-4.

DETAILED DESCRIPTION OF THE INVENTION

Figure 1:
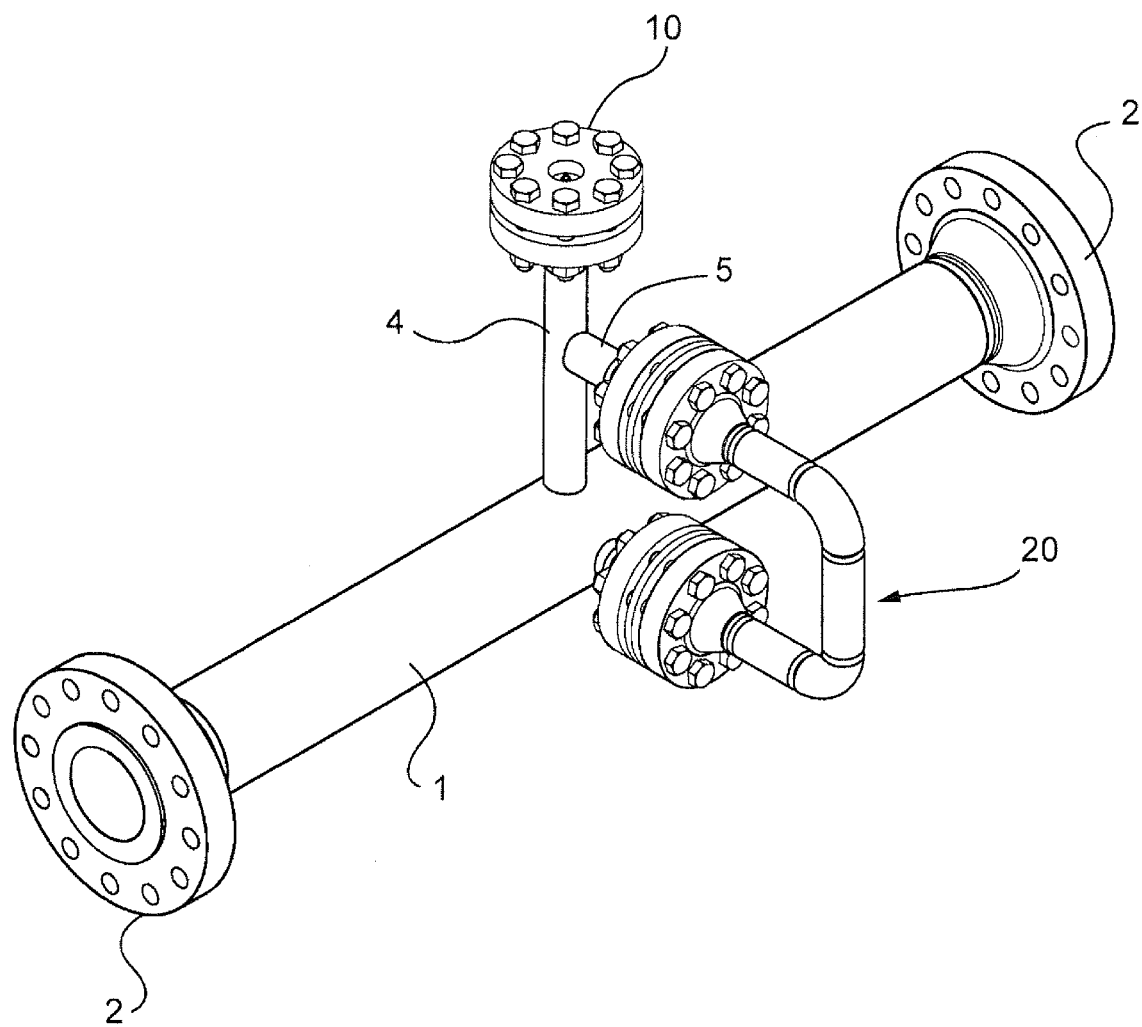
FIG. 1 is a perspective view of a load mitigator according to an embodiment of the invention.
Figure 2:
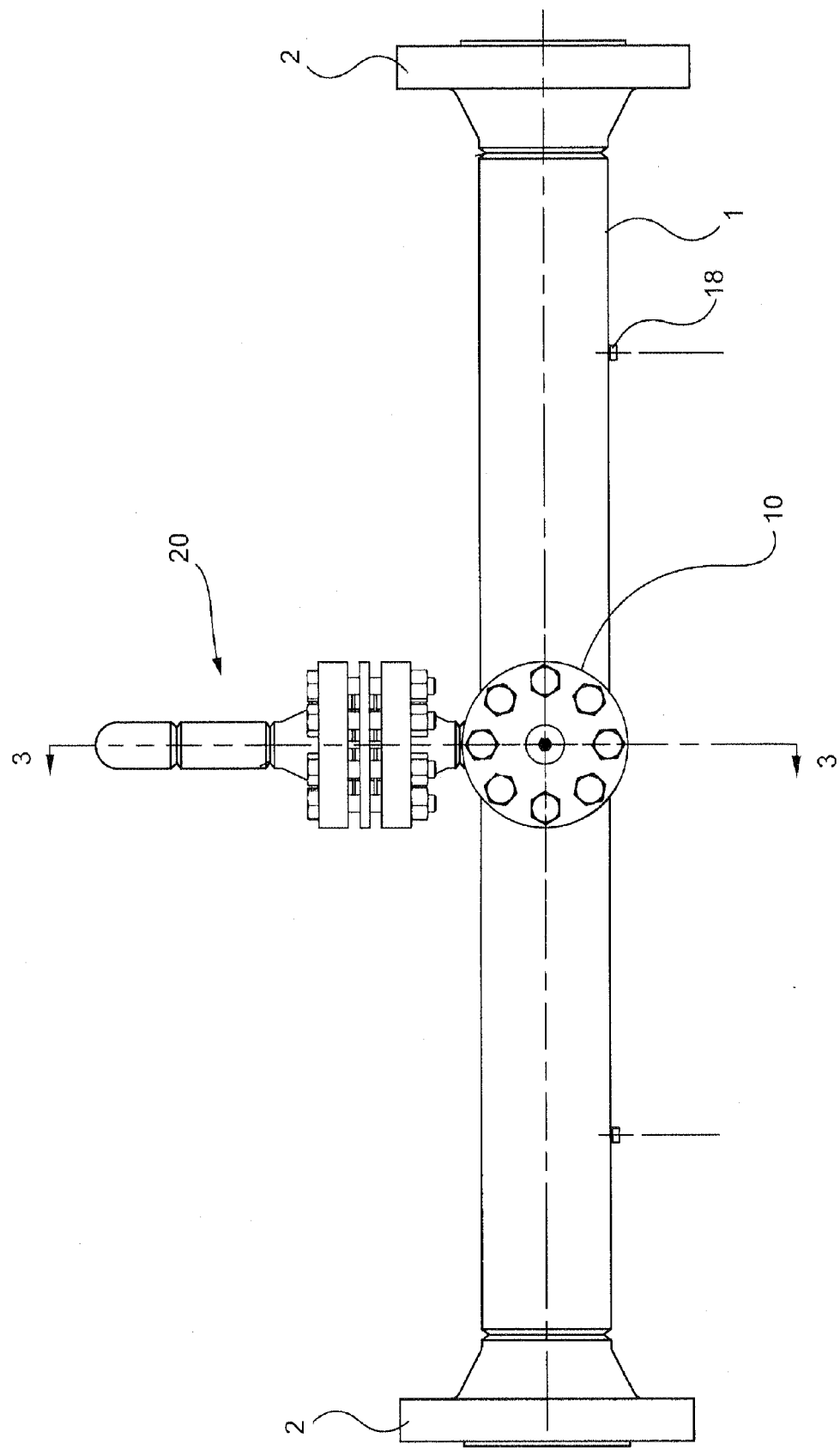
FIG. 2 is a plan view of the load mitigator of FIG. 1.
Figure 3:
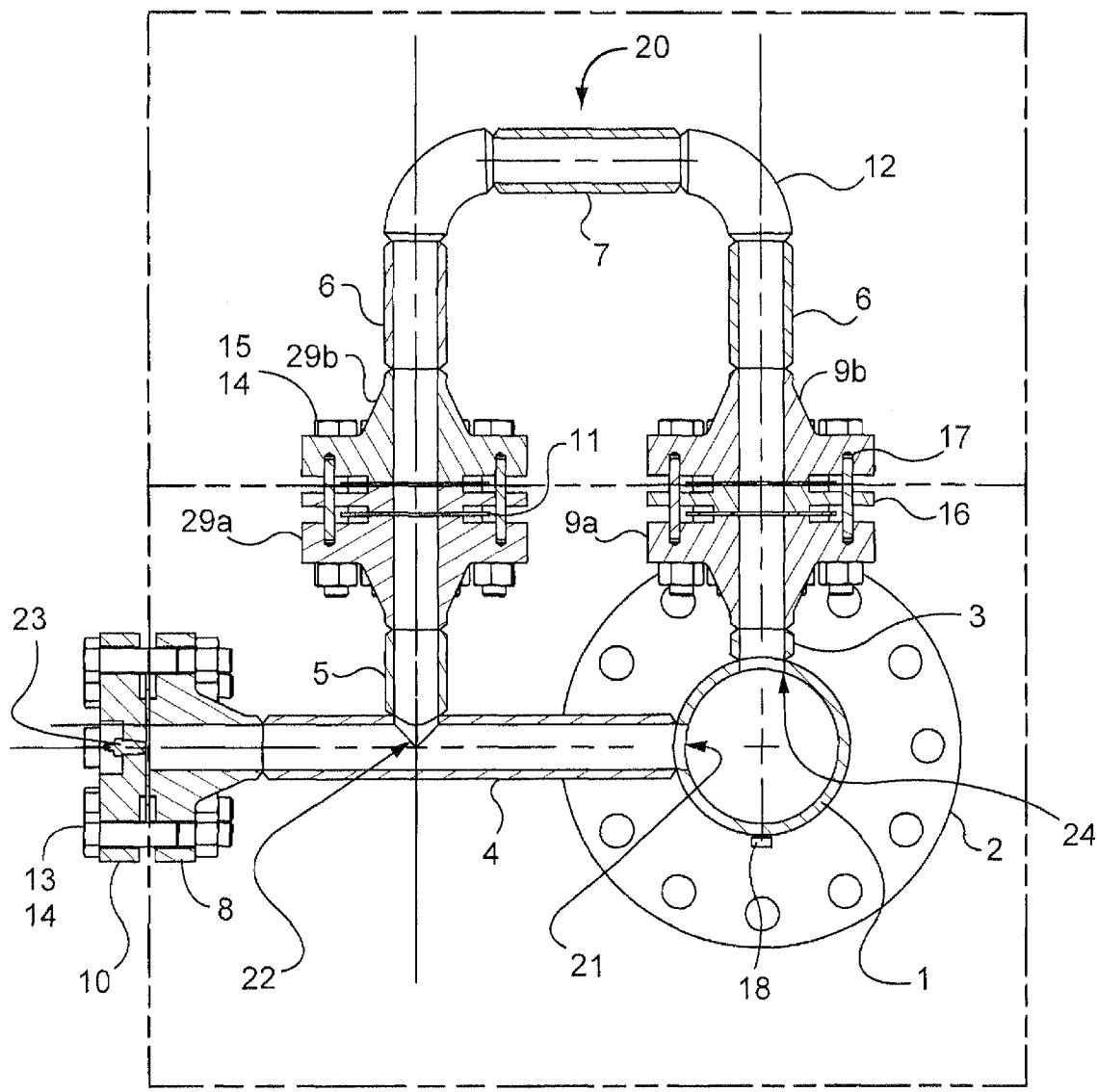
FIG. 3 is a cross-sectional view of the load mitigator of FIGS. 1 and 2.

Referring to FIGS. 1-3, a steam line pipe 1, for example, in a nuclear power generating station such as a boiling water reactor (BWR) comprises pipe flanges 2 at opposite ends for connection of the steam line pipe 1 to a steam delivery line. A pressure sensor 18 may be provided in the steam line pipe 1 to measure a pressure of steam carried by the steam line.

A standoff pipe 4 is connected to a first outlet 21 of the steam line pipe 1 for mounting of a safety relief valve (not shown) to a pipe flange 10 provided on the standoff pipe 4. A pressure sensor 23 is provided on the pipe flange 10 to measure pressure of the steam in the standoff pipe 4. A bypass pipe 20 is connected to the steam line pipe 1 and the standoff pipe 4.

Referring to FIG. 3, the bypass pipe 20 is connected at one end to the steam line pipe 1 at a second outlet 24 of the steam line pipe 1 by a pipe base 3. The bypass pipe 20 is connected at the other end to the inlet 22 of the standoff pipe 4 by a bypass pipe outlet pipe 5.

Figure 4:
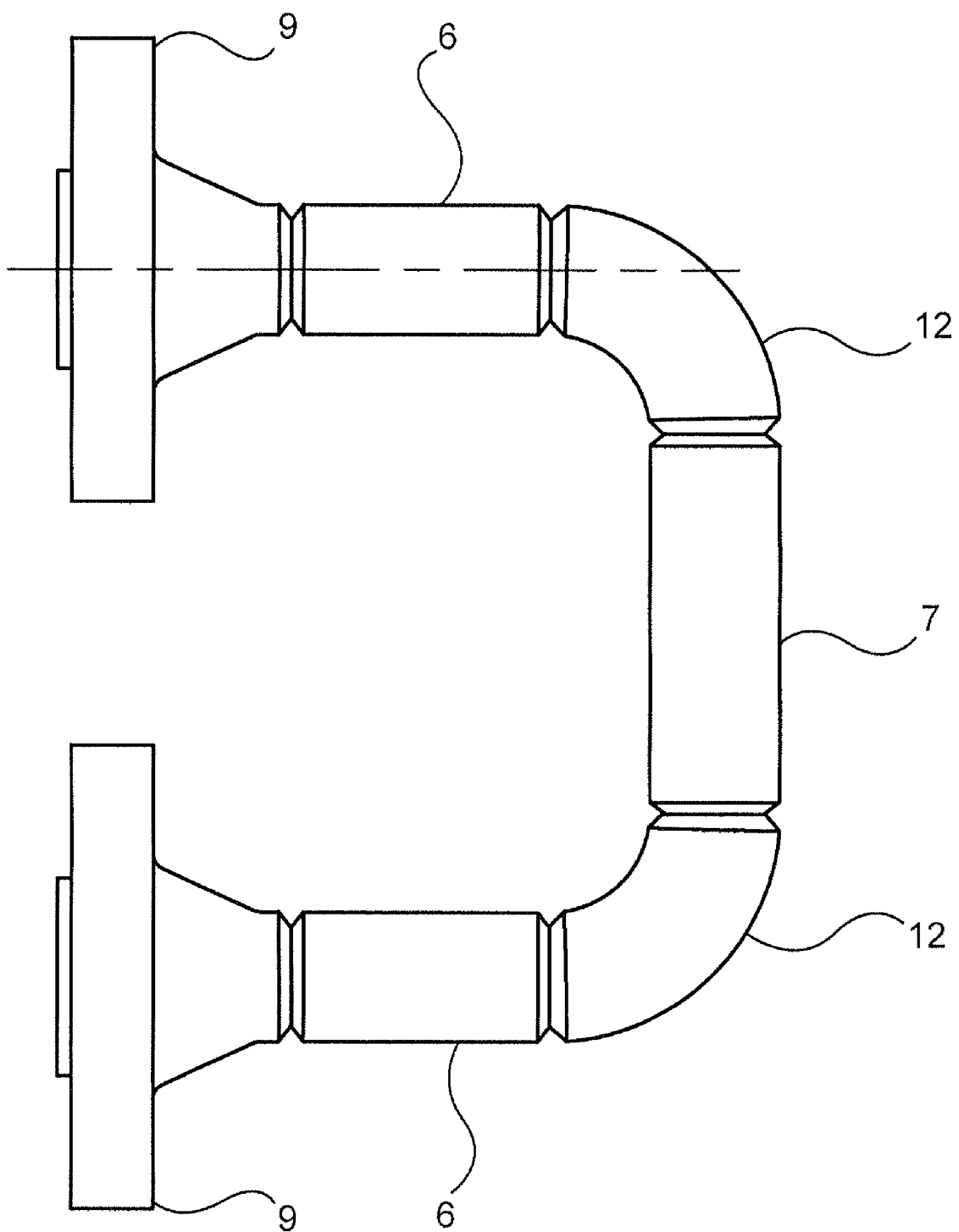
FIG. 4 is a side elevation view of a bypass pipe of the load mitigator of FIGS. 1-4.

Referring to FIGS. 3 and 4, the bypass pipe 20 includes a first pipe flange 9a connected to the second outlet 24 of the steam line pipe 1 by a pipe base 3 and a second pipe flange 9b is connected to the first pipe flange 9a by a fastener, such as a bolt 15 and a nut 14. A spacer 16 is provided between the first and second pipe flanges 9a and 9b. A seal, such as a gasket 11, is provided on both sides of the spacer 16 between the spacer 16 and the first and second pipe flanges 9a and 9b. Alignment pins 17 are provided through the spacer 16 and the pipe flanges 9a and 9b to align the first and second pipe flanges 9a and 9b with the pipe base 3.

Referring still to FIG. 3, the bypass pipe 20 comprises bypass pipe first segments 6, bypass pipe second segments 12 and a bypass pipe third segment 7. Although the bypass pipe 20 is shown as comprised of segments, it should be appreciated that the bypass pipe 20 may be formed of a single pipe extending from the pipe flanges 9 on the steam line pipe 1 to the pipe flanges 9 on the standoff pipe 4.

As shown in FIG. 3, the bypass pipe outlet pipe 5 is connected to the pipe segment 6 by first and second pipe flanges 29a and 29b separated by a spacer 16 and seals (e.g. gaskets 11) and aligned with alignment pins 17 in a manner similar to the connection of the pipe base 3 to the segment 6.

A pipe flange 8 is connected to the end of the standoff pipe 4. A second pipe flange 10 is connected to the pipe flange 8 by fasteners, for example, a bolt 13 and a nut 14. As shown in FIG. 2, the pipe flanges 8, 10 are shown as having eight apertures for receipt of eight bolt and nut fasteners. It should be appreciated that any number of apertures and fasteners may be used, and that the pipe flanges 8, 10 may be connected in some other manner.

The second pipe flange 10 is shown in FIGS. 5 and 6 and includes a tap 19 for connecting a safety relief valve to the standoff pipe 4. The pressure sensor 23 is received in the tap 19 of the second pipe flange 10.

A relief valve connected to the standoff pipe 4 forms a quarter-wave tube which may resonate with passing flow stream. In order to passively cancel acoustic noise at the resonance frequency, a bypass pipe 20 is provided between the steam line pipe 1 and the standoff pipe 4.

The distance between the second outlet 24 of the steam line pipe 1 and the inlet 22 of the standoff pipe 4 is a fraction of the wavelength of the acoustic noise to be cancelled. For example, the distance between the second outlet 24 and inlet 22 may be about one-half (½) of the quarter-wavelength, i.e. about one-eighth (⅛) of the wavelength of the resonance frequency.

The length of the bypass pipe 20 is another fraction of the wavelength of resonance frequency of the acoustic noise to be cancelled that provides an opposite of the maximum that is reached between the first outlet 21 and the inlet 22. For example, if the distance between the outlet 21 and the inlet 22 is ⅛ of the wavelength of resonance frequency of the acoustic noise to be cancelled, the length of the bypass pipe 20 (i.e. the distance from the first inlet 21 to the inlet 22) would be ⅝ of the wavelength.

The bypass pipe 20 provides a secondary flow that branches off the flow path provided by the standoff pipe 4 and then recombines the secondary flow with the main flow in the standoff pipe 4. A portion of the acoustic wave traveling in the standoff pipe 4 is diverted through the bypass pipe 20. The portion of the acoustic wave diverted through the bypass pipe 20 exits the bypass pipe 20 out of phase with the acoustic wave in the main flow through the standoff pipe 4, thus attenuating, or eliminating, the main flow path acoustic load.

It should be appreciated that other fractions of the quarter-wavelength of acoustic noise in the standoff pipe 4 to be cancelled may be used. For example, the distance between the outlet 21 and the inlet 22 may be equal to the quarter-wavelength and the length of the bypass tube 20 may thus be ¾ of the wavelength.

The bypass pipe described herein may be used to eliminate noise/acoustic loads from the resonance of the fluid inside the normally closed-off chamber formed by the standoff pipe and the safety relief valve. The bypass pipe described herein may be installed in existing operating plants. The bypass pipe may be used to reduce or eliminate acoustic pressures that may travel upstream from the reactor pressure vessel and cause damage to such devices as steam dryers. The bypass pipe thus removes the potential for such resonance and saves the steam dryers without increasing the loads anywhere else.

The bypass pipe described herein also does not introduce any flow blockage, is passive in its removal of the acoustic loading, and requires no external support. The bypass pipe described herein may thus be implemented very easily into existing plants. The bypass pipe also prevents high loading in the main steam lines and on such devices as steam dryers at flow conditions at which such loading would normally occur.

The bypass pipe also would enable or facilitate power uprates in nuclear power plants by eliminating a source of concern in power uprates, which is the increase of acoustic loads, with the attendant risk to steam dryers and other equipment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for reducing an acoustic load of a fluid flow, comprising:
 a first pipe, the first pipe comprising a first end and a second end and a first aperture and a second aperture, the first and second apertures being intermediate the first and second ends of the first pipe;
 a second pipe, the second pipe comprising a first end and a second end and a third aperture intermediate the first and second ends of the second pipe, the second pipe being connected at its first end to the first pipe at the first aperture and unconnected to the first pipe at its second end;
 a bypass pipe, the bypass pipe comprising a first end connected to the second aperture of the first pipe and a second end connected to the third aperture of the second pipe, wherein a first flow path is defined between the first aperture of the first pipe and the third aperture of the second pipe and a second flow path is defined by the bypass pipe, wherein a length of the first flow path is a fraction of a wavelength of an acoustic load generated in the second pipe by a main flow in the first pipe, and a length of the second flow path is a second fraction of the wavelength.

2. A system according to claim 1, wherein the first and second fractions are configured so that an acoustic load of a first flow along the first flow path is out of phase with a second flow along the second flow path at the third aperture.

3. A system according to claim 2, wherein the acoustic load of the first flow and the acoustic load of the second flow are 180° out of phase at the third aperture.

4. A system according to claim 1, wherein a pipe flange is connected to least one of the first end and the second end of the bypass pipe.

5. A system according to claim 4, further comprising a pressure sensor connected to the pipe flange.

6. A system according to claim 4, further comprising a second pipe flange connected to the pipe flange.

7. A system according to claim 6, further comprising a spacer between the pipe flange and the second pipe flange.

8. A system according to claim 7, further comprising a seal on each side of the spacer.

9. A system according to claim 8, wherein the seals comprise gaskets.

10. A system according to claim 1, wherein the bypass pipe comprises a plurality of pipe segments.

11. A system according to claim 1, wherein the bypass pipe is U-shaped.

12. A system according to claim 1, further comprising a pipe flange connected to the second end of the second pipe.

13. A system according to claim 1, wherein the first aperture and the second aperture are spaced an equal distance intermediate the first and second ends of the first pipe.

14. A system for reducing an acoustic load of a fluid flow, comprising:
- a first pipe, the first pipe comprising a first end and a second end and a first aperture and a second aperture, the first and second apertures being intermediate the first and second ends of the first pipe;
- a second pipe, the second pipe comprising a first end and a second end and a third aperture intermediate the first and second ends of the second pipe, the second pipe being connected at its first end to the first pipe at the first aperture and unconnected to the first pipe at its second end;
- a U-shaped bypass pipe, the bypass pipe comprising a first end connected to the second aperture of the first pipe and a second end connected to the third aperture of the second pipe, wherein
- a first flow path is defined between the first aperture of the first pipe and the third aperture of the second pipe and a second flow path is defined by the bypass pipe, wherein a length of the first flow path is a fraction of a wavelength of an acoustic load generated in the second pipe by a main flow in the first pipe, and a length of the second flow path is a second fraction of the wavelength, the first and second fractions are configured so that an acoustic load of a first flow along the first flow path is out of phase with a second flow along the second flow path at the third aperture, and the first fraction is $1/8$ and the second fraction is $5/8$.

15. A method of reducing an acoustic load of a flow in a standpipe connected at a first end to a first pipe at a first aperture in the first pipe, the first pipe being configured to carry a main flow, and the standpipe being unconnected to the first pipe at a second end, the method comprising:
- providing a first flow between the first aperture in the first pipe and an aperture in the standpipe, the aperture in the standpipe being between the first and second ends of the standpipe; and
- providing a bypass flow from the first pipe to the standpipe from a second aperture in the first pipe to the aperture in the standpipe;
- wherein the first aperture and the second aperture are at a same axial location of the first pipe.

16. A method according to claim 15, wherein the bypass flow is introduced into the flow in the standpipe out of phase with the flow in the standpipe.

17. A method according to claim 16, wherein the bypass flow is introduced into the standpipe flow 180° out of phase with the standpipe flow.

18. A method according to claim 15, wherein the bypass flow is U-shaped.

19. A method according to claim 15, wherein a length of the bypass flow is a fraction of a wavelength of an acoustic load generated by the standpipe flow.

* * * * *